(12) United States Patent
Rossi

(10) Patent No.: US 6,709,169 B2
(45) Date of Patent: Mar. 23, 2004

(54) THERMALLY AND MECHANICALLY STABLE LOW-COST HIGH THERMAL CONDUCTIVITY STRUCTURE FOR SINGLE-MODE FIBER COUPLING TO LASER DIODE

(75) Inventor: David M. Rossi, San Francisco, CA (US)

(73) Assignee: Powernetix, Inc., Sunnyvale, CA (US)

( * ) Notice: Subject to any disclaimer, the term of this patent is extended or adjusted under 35 U.S.C. 154(b) by 0 days.

(21) Appl. No.: 09/880,980

(22) Filed: Jun. 13, 2001

(65) Prior Publication Data

US 2002/0037142 A1 Mar. 28, 2002

Related U.S. Application Data

(60) Provisional application No. 60/236,934, filed on Sep. 28, 2000.

(51) Int. Cl.[7] .............................. G02B 6/36; G02B 6/42
(52) U.S. Cl. ........................... 385/92; 385/90; 385/137
(58) Field of Search ..................... 385/88–92, 136, 385/137

(56) References Cited

U.S. PATENT DOCUMENTS

| | | | | |
|---|---|---|---|---|
| 5,212,749 A | * | 5/1993 | Huggins et al. .............. 385/62 |
| 5,602,955 A | * | 2/1997 | Haake ......................... 385/136 |
| 5,631,987 A | * | 5/1997 | Lasky et al. .................. 385/88 |
| 5,859,947 A | * | 1/1999 | Kiryuscheva et al. ....... 385/136 |

\* cited by examiner

*Primary Examiner*—Hemang Sanghavi
*Assistant Examiner*—Omar Rojas
(74) *Attorney, Agent, or Firm*—Dorsey & Whitney LLP

(57) ABSTRACT

A structure that allows both axial and radial alignment between a laser diode and optical fiber to be achieved in a single attachment process. The structure incorporates an optics tube, fiber holder, laser diode and heat sink. The fiber holder is affixed to the inside surface at one end of the optics tube and retains a segment of fiber in axial alignment with and close proximity to the laser diode. The heat sink is placed into the opposite end of the optics tube and serves to draw energy in the form of heat away from the laser diode. The laser diode is powered via an electrical lead that attaches to a metalized ceramic substrate located between the laser diode and the heat sink. The symmetrical design of the structure is rigid and substantially insensitive to thermal and mechanical stresses that cause misalignment in planar designs of similar dimensional proportion. The optics tube and heat sink elements of the structure are substantially cylindrical in shape to allow high precision parts, as the heat sink and optics tube are easily turned and abrasively finished using standard machining equipment.

63 Claims, 15 Drawing Sheets

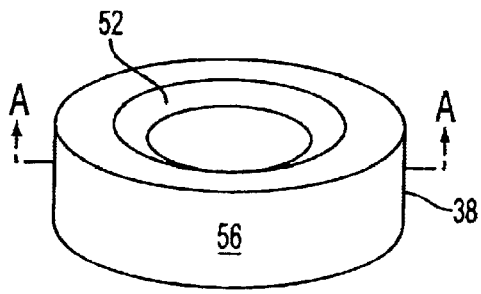
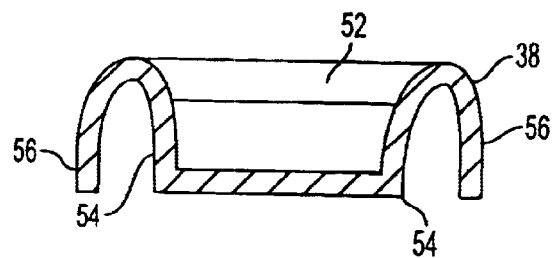
FIG. 9A    FIG. 9B
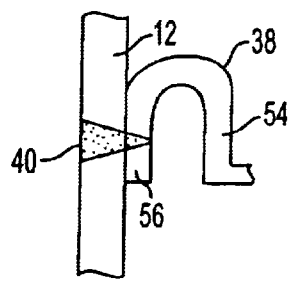
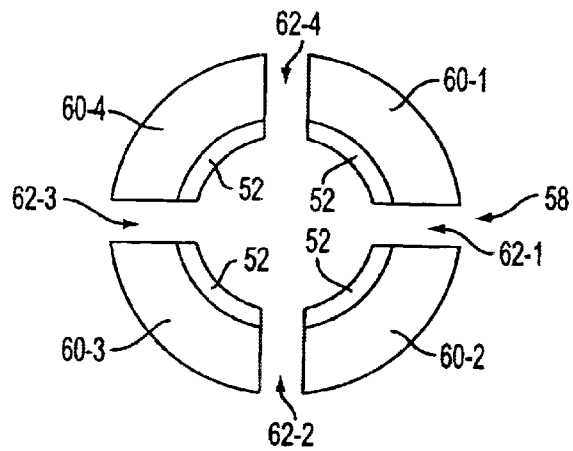
FIG. 9C    FIG. 10
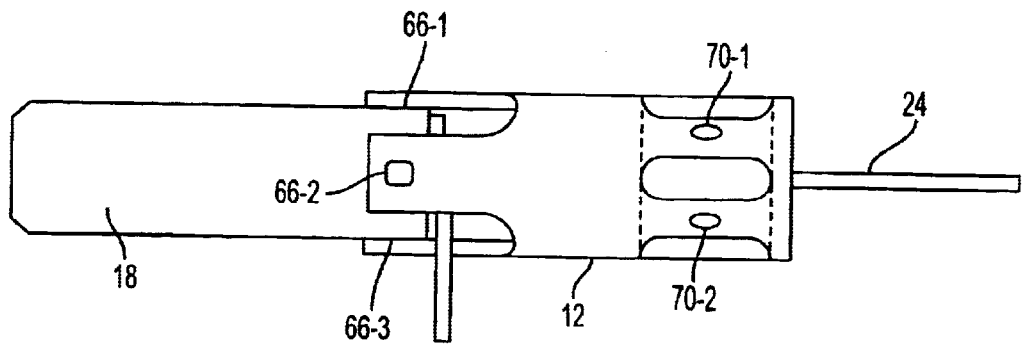
FIG. 11

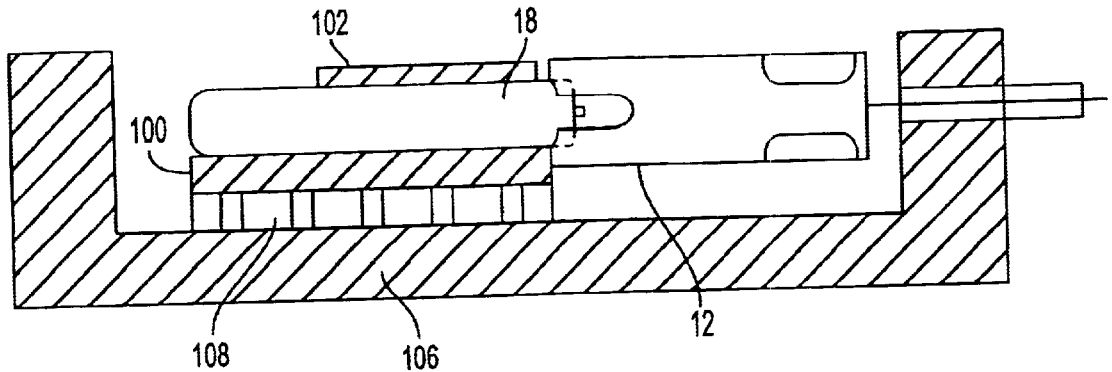
FIG. 13
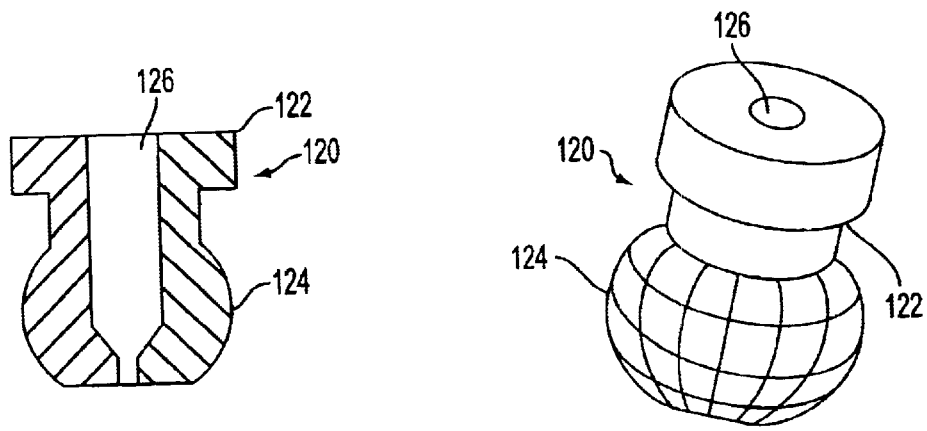
FIG. 14A
FIG. 14B

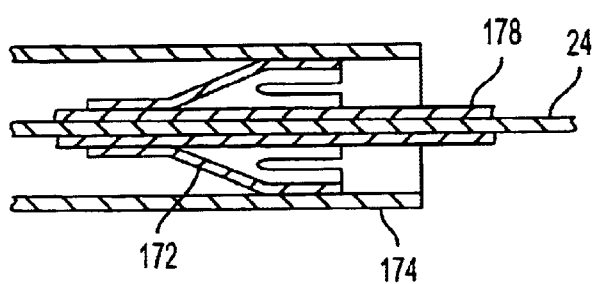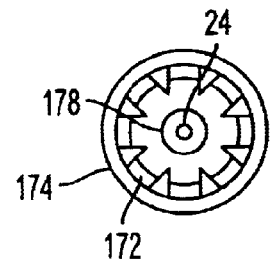
FIG. 21A  FIG. 21B
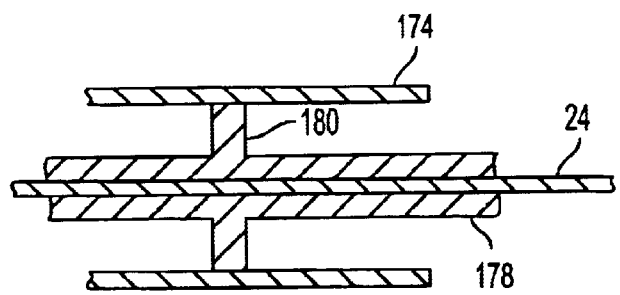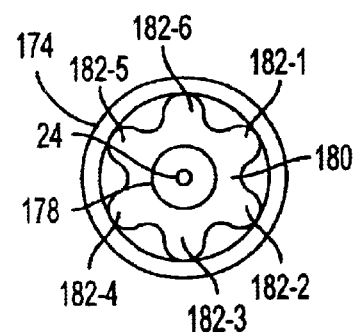
FIG. 22A  FIG. 22B

THERMALLY AND MECHANICALLY STABLE LOW-COST HIGH THERMAL CONDUCTIVITY STRUCTURE FOR SINGLE-MODE FIBER COUPLING TO LASER DIODE

RELATED APPLICATIONS

This application claims priority under 35 U.S.C. 119(e) to provisional patent application Ser. No. 60/236,934, filed with the United States Patent and Trademark Office on Sept. 28, 2000; which application is hereby incorporated by reference.

FIELD OF THE INVENTION

The present invention is broadly related to structures and methods for coupling optical fibers to laser diodes and more particularly to thermally and mechanically stable high thermal conductivity structures and methods for coupling.

BACKGROUND OF THE INVENTION

The three most common techniques used to align and attach single-mode optical fibers to high power laser diodes are molten solder fiber capture, omega yoke laser weld, and axial designs with separate X/Y and Z alignment laser welds. Techniques that use organic adhesives as a means of fiber attach are generally unsatisfactory because of thermal mismatch problems, mechanical stability problems, and laser reliability concerns. Although each method has been made to work they each suffer from significant deficiencies that negatively affect cost, performance, and reliability of the finished assembly.

Directing attention to FIG. 1, one common coupling and aligning technique, molten solder fiber capture, captures a metalized fiber in a molten drop of solder located close to the laser diode. When the solder is allowed to cool, the fiber is fixed in place. This technique suffers from a number of drawbacks. The solder solidification results in shrinkage that causes misalignment of the fiber from the laser diode. To correct the misalignment, the solder is re-melted, the fiber position is adjusted. The process is often inaccurate, and must be repeated numerous times to achieve good fiber alignment. Such an approach is costly as it requires an operator and the use of an alignment station during the time required for all of the solder re-flow operations. Another shortcoming of the molten solder capture technique is the significant potential for contamination of the laser diode facet from the molten solder pool and any contaminants that get onto the solder perform or substrate. Molten solder capture also presents a danger of overheating the laser diode, since the operation of the laser and the melting of the solder occur simultaneously. The solder typically used requires processing at temperatures above 300 Celsius. Metal coatings around the fiber and the metalization under the solder pool deteriorate with each melt cycle. After the solder solidifies and shrinks, the fiber is highly stressed at the two places where it emerges from the molten solder pool. This makes the fiber susceptible to breakage. The residual stresses in the solder are high enough that stress relaxation results in significant coupling efficiency changes. A high temperature oven bake is required to stabilize the assembly or significant coupling changes are likely to result over extended periods. The technique is generally associated with planar package structures. The planar designs are torsionally weak and subject to optical misalignment from torsional forces. Strains that result from uneven package bolt down forces, or from imbalanced thermal stresses can lead to significant changes in fiber coupling efficiency. Planar structures are generally not rigid enough to allow significant path lengths or multiple optical elements. Alignment is usually performed with the assembly positioned within the package because of the sensitivity of the planar structure to stresses. This generally reduces access and visibility and reduces fiber alignment package yields while incurring high assembly labor and other costs.

Directing attention to FIG. 2, another known assembly and alignment method is the omega yoke technique that typically uses a laser welder to fix a fiber into an omega shaped metal support structure located directly in front of and in close proximity to the laser diode. This technique is commonly used for assembly of packages incorporating lensed fiber tips. The laser welded omega yoke technique uses a planar structure and thus suffers from the torsional rigidity problems of planar structures, the difficulty in allowing a long optical path or in incorporating additional optical elements, and the need to work inside of the package during alignment. Because laser welding occurs in close proximity to the unshielded laser facet there is the potential for laser ablated material and evaporated contaminants from the parts to be deposited on the laser facet. Because the weld process is not symmetric about the optical axis, each weld results in movement toward the mounting surface. The final alignment process is largely hit and miss, with a starting position above the optimum coupling position and each subsequent weld pulling the parts down and right or left. The cost of using the laser welded omega weld technique is high because an expensive combination laser welder and alignment station is tied up during the process. Also, the omega yoke is not as rigid as the molten solder method.

Directing attention to FIG. 3, the known technique of axial design with separate X/Y and Z laser welds requires the fiber alignment mechanism to be welded to the face of a hole bored along the laser optical axis. The fiber is pre-assembled into a weldable metallic tube. The tube slides axially through a bushing that abuts the face of the bored hole. Z axis alignment achieved by sliding the fiber metallic tube axially through the bushing hole. X/Y alignment is achieved by allowing the bushing to slide on the face of the bored hole. Two separate weld operations are required to permanently fix the fiber into alignment with the laser. It is customary to first align and weld the metallic fiber tube to the bushing to affix the Z axis. The X/Y plane is then realigned and the bushing laser welded to the face of the bore to fix the X/Y plane. There is weld distortion at each weld operation. The welds that attach the bushing to the bore face provide the only support to maintain fiber alignment. Weld shrinkage in this fillet weld often results in radial, axial, and angular misalignment. It is often necessary to resort to mechanical bending to try to achieve realignment. Laser hammering, the deliberate shrinkage of additionally applied asymmetric welds is used as a means to pull the structure back into alignment. Laser hammering is often touted as a benefit, but really is a sign of a design that has an unstable nature. The coupling value achieved before welding is seldom attained in the finished part. It should be noted that the assembly falls apart if released from the alignment fixture before welding. The parts have no inherent ability to remain aligned because all of their strength comes from the welds. It should also be noted that the operator, the alignment station, and the welder are tied up during both alignments as well as during laser hammering or mechanical bending. The reduced throughput of expensive laser alignment stations results in higher assembly costs.

Axial designs transfer heat from the laser diode to the package through a path that includes the same parts that provide mechanical support to the optical elements. Asymmetrical temperature gradients then occur which result in thermally induced losses of fiber coupling efficiency. Similarly, mechanical forces required to mount the aligned assembly to the package are often transmitted asymmetrically through optical support structures. The result is a completed assembly sensitive to temperature, package mounting stresses, and laser power dissipation.

In light of the shortcomings of the previous methods of aligning and attaching optical fibers to laser diodes, there remains a need for structure and method for coupling and aligning optical fibers to laser diodes that incur relatively low cost and yield higher connection efficiencies.

SUMMARY OF THE INVENTION

The present invention overcomes the shortcomings of the previous approaches to aligning and attaching optical fibers to laser diodes by providing a structure that allows both axial and radial alignment between a laser diode and optical fiber to be achieved in a single attachment process. The structure incorporates an optics tube, fiber holder, laser diode and heat sink. The fiber holder is affixed to the inside surface at one end of the optics tube and retains a segment of fiber in axial alignment with and close proximity to the laser diode. The heat sink is placed into the opposite end of the optics tube and serves to draw energy in the form of heat away from the laser diode. Optionally, a lens and lens holder may be incorporated into the structure between the laser diode and the fiber holder to focus laser energy on the end of the fiber. The laser diode is powered via an electrical lead that attaches to a metalized ceramic substrate located between the laser diode and the heat sink. The symmetrical design of the structure is rigid and substantially insensitive to thermal and mechanical stresses that cause misalignment in planar designs of similar dimensional proportion. The optics tube and heat sink elements of the structure are cylindrical in shape to allow high precision parts, as the heat sink and optics tube are easily turned and abrasively finished using standard machining equipment. The cylindrical shape of the heat sink also provides easy automation of a pre-tested semiconductor in fixturing with excellent thermal transfer. The high accuracy and finish of the cylindrical heat sink also allows excellent thermal transfer from the heat sink to auxiliary structures by mechanical means of fixation.

Because the heat sink and fiber holder elements are rigidly connected to each other via the optics tube, the heat sink car, be attached to other package structures without affecting the critical alignment between the laser diode and optical fiber. A plurality of welds can be used to connect the fiber holder and heat sink to the optics tube so that forces are transmitted through the structure through direct physical contact between the various elements. After alignment and before welding, elements can be released from an alignment fixture yet retain their alignment. By using mechanical attachment methods to secure the structure of the present invention to auxiliary structures, such as packages having thermoelectric cooler (TEC) elements, the present invention eliminates the need for large thermal excursions as required for soldering, or organic materials such as epoxy, as used in conventional methods of attaching a precision aligned laser and optical fiber to an auxiliary structure.

BRIEF DESCRIPTION OF THE DRAWINGS

FIG. 9A is a perspective view of an embodiment of a lens holder;

FIG. 9B is a cross sectional view of the embodiment of the lens holder in FIG. 9A;

FIG. 9C is a cross sectional view of the embodiment of lens holder in FIG. 9A and optics tube;

FIG. 10 is a plan view of an alternative embodiment of the lens holder;

FIG. 11 is a profile view of embodiments of the optics tube, heat sink and electrical lead, showing welds used to secure the heat sink and fiber holder to the optics tube;

FIG. 13 is a profile view of an embodiment of the present invention incorporated into a package utilizing a thermoelectric cooler (TEC);

FIG. 14A is a cross section of the rod/ball embodiment of the fiber holder;

FIG. 14B is a perspective view of the rod/ball embodiment of the fiber holder in FIG. 14A;

FIGS. 21A and 21B provide cross sectional views of an embodiment of the fiber holder having a split finger design;

FIGS. 22A and 22B provide cross sectional views of an embodiment of the fiber holder with a perimeter that has a non-circular profile;

DETAILED DESCRIPTION OF EMBODIMENTS OF THE INVENTION

Figure 1:
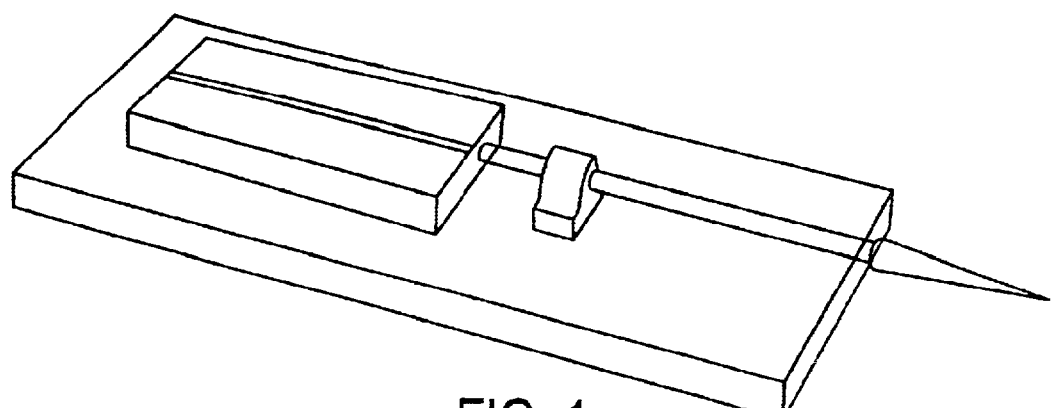
FIG. 1 is an illustration of a laser diode coupled to an optical fiber using the method of molten solder capture as known in the prior art.
Figure 2:
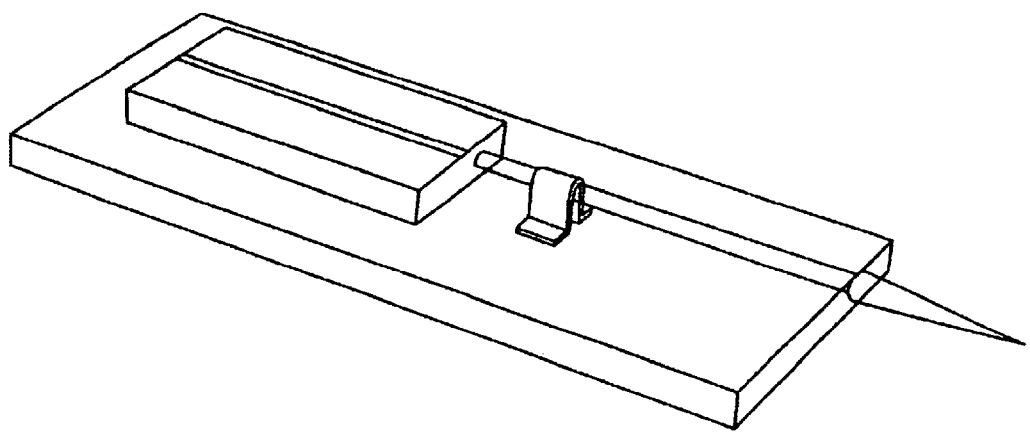
FIG. 2 is an illustration of a laser diode coupled to an optical fiber using the method of laser welded omega yoke as known in the prior art.
Figure 3:
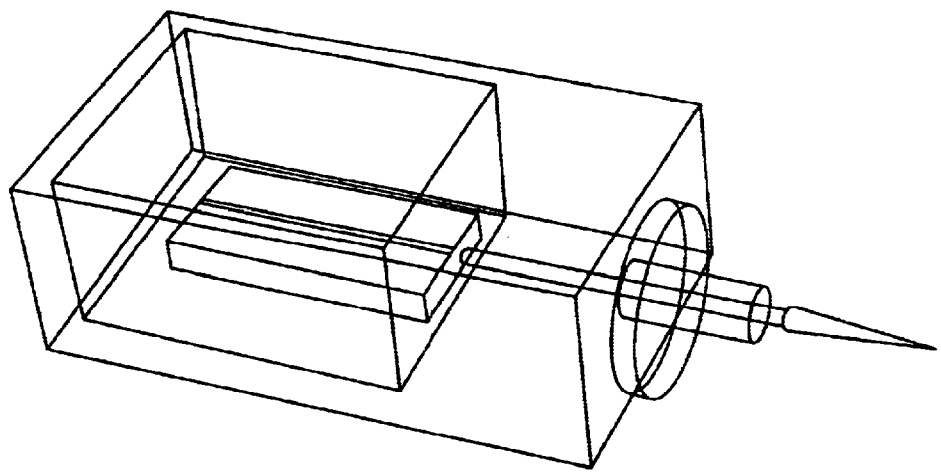
FIG. 3 is an illustration of a laser diode coupled to an optical fiber utilizing an axial design having separate X/Y and Z laser welds as known in the prior art.

Exemplary embodiments of the invention are now described relative to the figures. Directing attention to FIG. 4, structure 10 incorporates optics tube 12, fiber holder 14, laser diode 16 and heat sink 18 in alignment with optical axis 20 into a substantially rigid assembly that can be placed in a larger optical fiber package. As shown in FIG. 5, fiber holder 14 is substantially spherical in shape but may have flat faces 27, 29. Fiber holder 14 has a central bore 15 that aligns with optical axis 20 and receives optical fiber 24. Central bore 22 has a reduced diameter proximate a terminal portion 26 where optical fiber mounts or emerges from fiber holder 14 to provide a secure fit for tip 28 of optical fiber 24. The optical fiber tip 28 is metalized so that it can be soldered into place once the optical fiber 24 is inserted into the central bore 22. If desired, the face of the fiber may be polished flush with the flat face 29 of the fiber holder 14. In such embodiments, the fiber holder 14 acts as an integral tool and polishing aid.

Laser diode 16 is attached to heat sink 18 by metalized substrate 30, which receives electrical lead(s) 32 that powers laser diode 16. Substrate 30 may be constructed from materials such as metalized diamond, metalized ceramic or other materials as are known in the art. Substrate 30 is also attached to heat sink 18, thus providing heat transfer away from laser diode 16.

During operation, laser diode 16 emits or transmits laser energy 34 toward fiber tip 28. Alternatively, optional lens 36 may be placed between fiber tip 28 and laser diode 16, to focus or otherwise concentrate the laser energy 34 emitted from laser diode 16 on fiber tip 28 via light cone 37. Lens holder 38 provides an interface or mount between lens 36 and the interior surface of optics tube 12.

Figure 6:
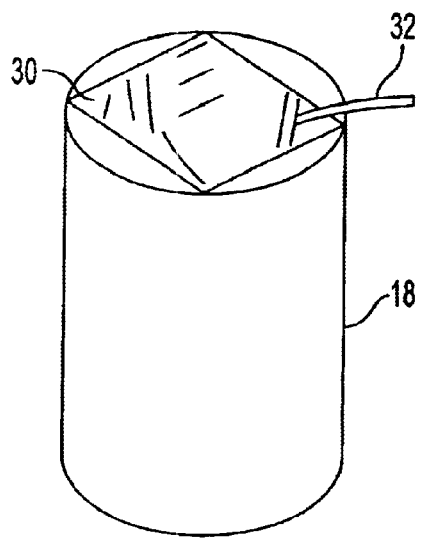
FIG. 6 is a perspective view of embodiments of the heat sink, substrate, and electrical lead.

FIG. 6 provides a perspective view of embodiments of heat sink 18, substrate 30, and electrical lead(s) 32. Advantageously, heat sink 18 is a section of cylindrical rod that is accurately ground to a substantially uniform diameter and has a good surface finish. Electrical lead(s) 32 is bonded to substrate 30 and a break in metalization is provided at the point of contact 46 where the end of electrical lead 32 meets substrate 30.

Figure 7:
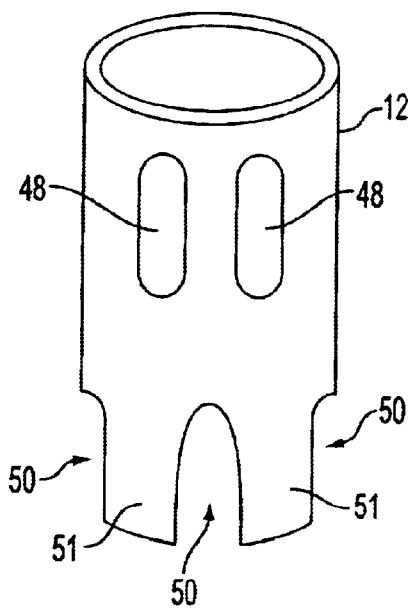
FIG. 7 is a perspective view of an embodiment of the optics tube.

FIG. 7 provides a perspective view of an embodiment of optics tube 12. Optics tube 12 comprises a cylindrical support tube that is open at both ends and has a plurality of access slots 48 for the fiber holder 14, as well as a plurality of base cuts 50. Access slots 48 allow the fiber holder 14 to be adjusted during assembly and alignment of the optics tube 12 with optical axis 20. Optional base cuts 50 allow the optics tube 12 and heat sink 18 to be positioned with respect to each other once the optics tube 12 has been placed over the end of the heat sink 18.

Figure 8:
FIG. 8 is a profile view of an embodiment of a lens used in connection with embodiments of the present invention.

FIG. 8 illustrates a cross sectional view of an embodiment of the lens 36. Single or multiple element lenses may be used either alone or in association with a separate lens mount.

FIGS. 9A, 9B, and 9C provide perspective views (FIGS. 9A and 9C) and a cross sectional view (FIG. 9B) of an embodiment of lens holder 38. Lens 36 and lens holder 38 are optional, and are used in embodiments of the present invention to focus laser energy on the fiber tip 28 to provide better coupling of the output of the laser diode with the end face of the optical fiber. In one embodiment, lens 36 is pressed into the lens holder 38. As shown in FIG. 9A, one embodiment of lens holder 38 is substantially cylindrical in shape, with a step or chamfer 52 around an inner surface to provide a secure fit for lens 36. The step, chamfer or other shape is provided to match the physical shape of the lens or lens mount. As shown in cross sectional FIG. 9B, lens holder 38 has an inner section 54 that receives the lens 36 and an outer section 56, concentric with respect to inner section 54, that is brought into contact with the inner surface of optics tube 12 when the lens holder 38 is installed in the structure 10. By providing separate sections 54, 56, the lens 36 is sufficiently separated from the regions at which heat is applied thus preventing heat damage that may occur during welding. The path between region 56 and region 54 at which lens 36 is mounted may be adjusted to provide the required path distance. The lens holder 38 is secured to the inner surface of optics tube by brazing, press fit, or laser welded to the optics tube 12 by penetration of the optics tube 12 by a laser or other heat generating beam. In laser weld embodiments, as shown in FIG. 9C, a weld 40 is performed between outer section 56 and optics tube 12, such that a plurality of welds are distributed around the optical axis 20. In one embodiment the welds are distributed symmetrically around the optical axis.

FIG. 10 shows a plan view of an embodiment of an alternative lens holder. Lens holder 58 can be split into a plurality of separate pieces, for example, into four pieces 60-1, 60-2, 60-3, and 60-4, where each piece constitutes a segment of the cylindrical shape of lens holder 38. By positioning pieces 60 symmetrically about the optical axis 20 and welding them as described above to the inner surface of optics tube 12, a series of slots 62-1, 62-2, 62-3, and 62-4 are provided between the pieces 60 and extending parallel along the optical axis 20. The slots 62 relieve stresses on the lens 36 that may result from a press fit installation. Lens holders 38, 58 are both suitable for low-cost fabrication either from stamping and forming from sheet material. While an embodiment having four pieces is illustrated, it will be understood that other numbers of pieces may be used. For example, lens holders 58 having or formed from two, three, four, five, six or more pieces may be used.

The electrical lead 32 is brazed to the upper flat surface of the heat sink 18 using Au/Ge eutectic or other suitable alloy brazing material. The laser diode 16 is die attached to the substrate 30 with Au/Sn eutectic or other suitable alloy. Alignment of the substrate 30 to the heat sink 18 is achieved through fixturing from the heat sink 18 outer diameter.

Alignment of the laser diode 16 is achieved by performing optical alignment using the heat sink diameter as a reference, or by alignment marks on the substrate 30. It should be noted that either vertical emission lasers, such as VCSEL's, or edge emitting lasers can be accommodated, only the shape and thickness of the substrate 30 being different in the two cases.

Fiber holder 14 has an outer diameter slightly smaller than the inner diameter of the optics tube 12 so that once the optical fiber 24 is secured by the fiber holder 14, the fiber holder 14 is slid into the optics tube 12. In certain embodiments, the fiber holder is placed in contact with the forward edge of the lens holder 38, 58 to provide a rough rotational alignment with the optical fiber placed in approximate alignment with the optical axis 20.

An embodiment of the assembled structure is illustrated in FIG. 11. The assembled optics tube 12, fiber holder 14, optical fiber 24, lens 36 and lens holder 38 forms a unit that is slid over the outer diameter of the heat sink 18. The heat sink 18 is properly sized for a close fit. The optics tube 12 is oriented so that one of the base cuts 50 is centered or substantially centered about the electrical lead 32 that extends radially from the substrate 30 attached to the heat sink 18. The depth to which the optics tube 12 is inserted over the heat sink 18 is controlled by appropriate fixturing. The optics tube 12 is then welded to the heat sink 18 by a plurality of laser welds 66 penetrating the circumference of the optics tube on the fingers 51 that separate the base cuts 50.

With the optics tube secured around the circumference of the heat sink for heat removal and mechanical support and the fiber holder 14 secured to the optics tube 12, the laser diode 16 is turned on. The fiber holder 14 can be moved axially along the optical axis 20, and rotated in two angles about the optical axis 20 until the center of optical fiber tip 28 is in the central portion of the laser beam or when optional lens 36 is used at the focal point of the laser beam focused through the lens 36. The fiber holder 14 is then fixed in place by laser welds 70 that penetrate through the optics tube 12 and into the fiber holder 14.

The materials of construction for the parts of a representative embodiment are kovar or invar for the optics tube, 12 fiber holder 14, and lens holder 38, 58. These materials have low coefficient of expansion. The heat sink 18 can be effectively made from copper/tungsten or molybdenum, though other materials having desired heat transfer characteristics may alternatively be used. Plating of approximately 0.002 inches of nickel on the outer surface of the heat sink 18 can be performed to improve weldability, but this thickness is not generally critical. Sputtered or electro-deposited gold can be used on the flat ends of the heat sink 18 to allow fluxless brazing of the substrate 30 as well as to allow wire bonding. The kovar or invar parts should desirably be stress relieved after machining for dimensional stability and low expansion. A thin nickel plate can be applied to prevent oxidation of the kovar parts. Aluminum nitride or beryllia ceramics provide a good high thermal conductivity surface upon which to mount the laser diode 16.

Figure 12A:
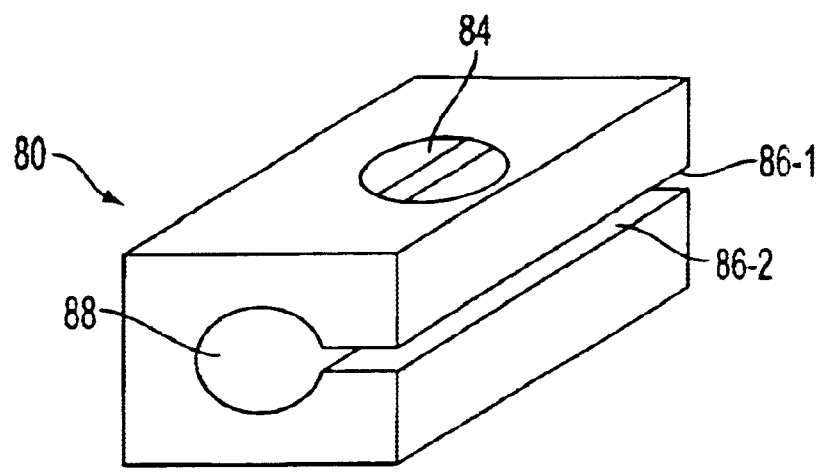
FIG. 12A is a profile view of an embodiment of the split block clamp.
Figure 12B:
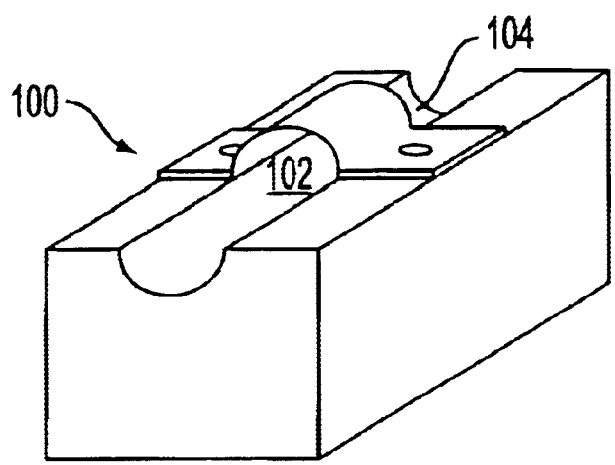
FIG. 12B is a profile view of an alternative embodiment of the block clamp.

Attention is now directed to embodiments of mechanical clamp structures for effectively removing heat from the heat sink 18 relative to FIG. 12A and FIG. 12B. The heat sink 18 can be attached permanently, or for test purposes, to split block 80 (FIG. 12A) or open clamping block 100 (FIG. 12B), both of which provide excellent mechanical attachment and thermal contact. With respect to FIG. 12A, a first clamping structure and method is now described. Split block 80 provides high clamping force and excellent thermal transfer to split block 82 when the clamp screw 84 is tightened, thus bringing the interior surface of split block 80 into contact with the heat sink 18 when the block face 86-1 is brought closer to the opposing block face 86-2. Block face 86-2 has a threaded bore (not shown) that receives clamp screw 84. Split block 80 incorporates central bore 88 having a sufficient diameter to receive heat sink 18.

With respect to FIG. 12B, a second embodiment of a clamping structure and method is now described. Clamping block 100 provides high clamping force and excellent thermal transfer when securing strap 102 is brought into contact with heat sink 18 by tightening screws into threaded bores in the body of the block 100. Groove 104 has sufficient dimensions to receive the arcuate surface of heat sink 18. Groove 104 may be a cylindrical, V-shaped, or other cut or depression that will hold the heat sink 18. Clamping block 100 is particularly useful in applications where clearance in the axial direction is restricted. Clamping block 100 also can be used with a layer of thin foil of soft malleable material such as indium foil placed between the heat sink 18 and groove 104 to improve thermal transfer between the parts.

Both split block 80 and/or clamping block 100 can be incorporated into a larger fiber optics package. FIG. 13 shows the clamping block 100 as used in a package 106 where the clamping block 100 is bonded to a thermoelectric cooler 108 and the package wall limits axial space.

Figure 4:
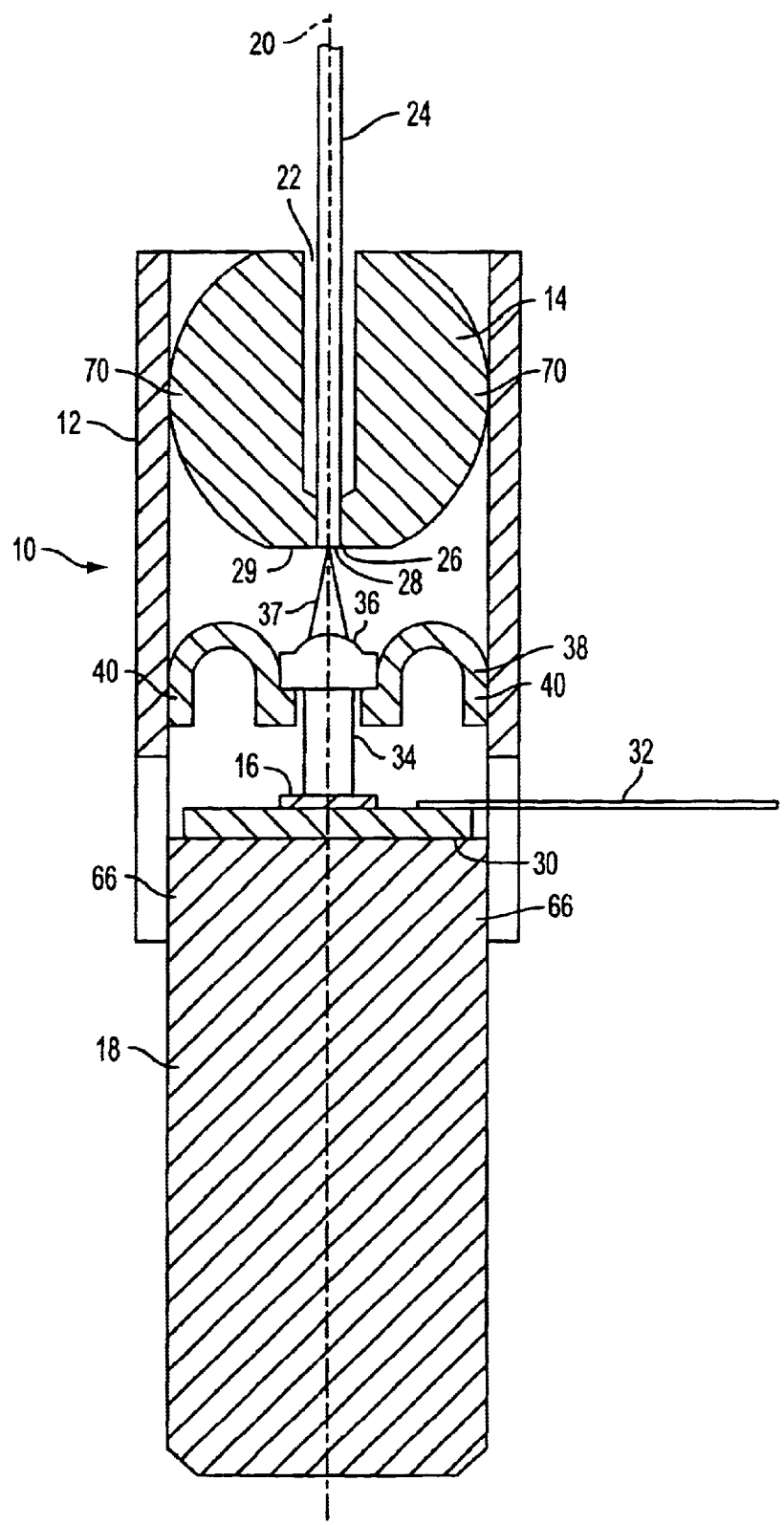
FIG. 4 is a cross sectional view of an embodiment of the present invention.
Figure 5:
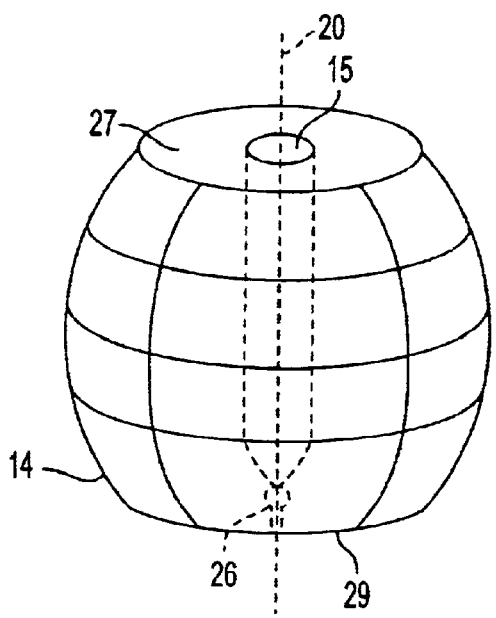
FIG. 5 is a perspective view of an embodiment of a ball holder.
Figure 14C:
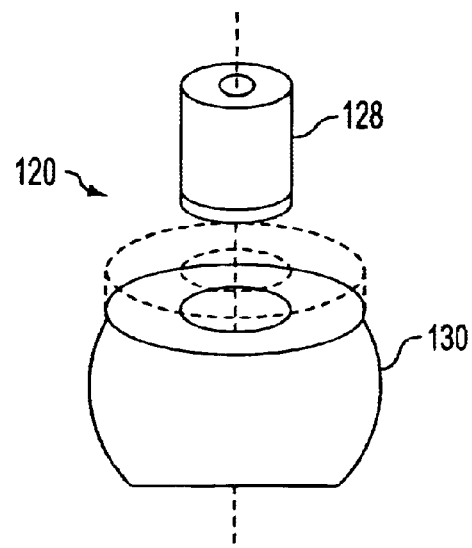
FIG. 14C is a perspective view of separate elements that comprise an embodiment of the rod/ball fiber holder.

An alternative fiber holder 120 embodiment of the fiber holder 14 shown and described relative to FIG. 4 is now described relative to FIGS. 14A and 14B. Rod/ball fiber holder 120 incorporates a cylindrical rod portion 122 and having a substantially spherical portion 124 at one end. Central bore 126 is located through the center of the rod/ball fiber holder 120, and spans the entire length of rod/ball fiber holder 120. Rod/ball fiber holder 120 can be constructed from a cylindrical rod that is turned on a lathe to shape the spherical portion 124, or it can be fabricated by pressing or joining a tubular ferrule 128 to a full or truncated ball 130 having a hole through its center (FIG. 14C).

The rod/ball fiber holder 120 has a number of advantageous and beneficial characteristics. The cylindrical rod section 122 provides a surface for securely gripping the rod/ball structure 120. The cylindrical rod section 122 also provides a reference direction for fiber alignment that is not directly provided with the fiber holder 14 embodiment. Rod/ball fiber holder 120 also eliminates the need for access slots 48 in the optics tube 12 that were used to manipulate the fiber holder 14 during alignment. Without access slots, fabrication of the optics tube 12 is simplified and the optics tube 12 is generally more rigid. The rod/ball fiber holder 120 is easy to manufacture using conventional machine tools. The ferrule 128 as shown in FIG. 14C can be a standard ceramic or metal ferrule used in fiber optic connectors. These standard parts can be purchased at very low cost with extremely precise tolerances and with hole diameters suitable for any standard optical fiber.

Figure 15A:
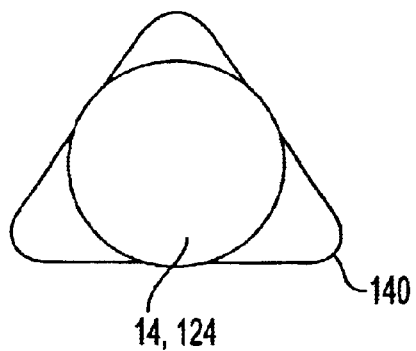
FIG. 15A is a cross sectional view of a deformed tube embodiment of the optics tube before insertion of the fiber holder.
Figure 15B:
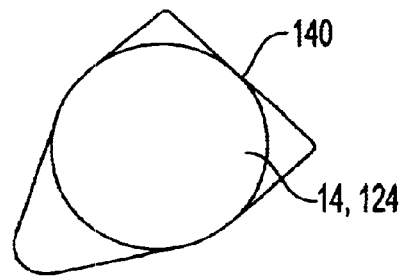
FIG. 15B is a cross sectional view of a deformed tube embodiment of the optics tube after insertion of the fiber holder.

While an optical tube 12 has a generally cylindrical shape with circular cross section, other embodiments of the invention and of the optics tube have a non-circular cross section. One embodiment of such an optics tube provides advantage relative to possible weld shrinkage. By providing an accurate fit between either the fiber holder 14 or spherical portion 124 of rod/ball fiber holder 120 (referred to herein collectively as ball 14, 124) and the inside of the optics tube 12 when the mating surfaces are welded, the shrinkage of the weld nugget during cooling and solidification will not pull the parts away from axial alignment. If the section of the optics tube where the ball 14, 124 contacts the tube wall is larger than the ball 14, 124 the optics tube can be deformed from its cylindrical shape into another non-cylindrical shape, such as a triangularized (or square, or hexagon, or other) shape (FIG. 15A). The tube wall and the deformed tube should be sufficiently flexible so that there is a slight interference or frictional fit when the ball 14, 124 is inserted (FIG. 15B). With a perfectly cylindrical tube the friction associated with the interference fit can cause the ball 14, 124 to seize in the tube 12 because the circular cross section of the tube is the shortest distance around the circumference of the ball. However, the deformed shape tube 140 allows the ball portion 14, 124 to slide axially as well as rotate because the thin wall of the non-circular cross section optics tube 140 has extra length and therefore can distend somewhat to receive the ball 14, 124.

Figure 15C:
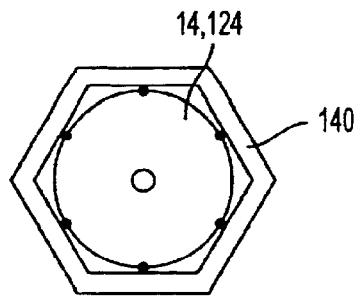
FIG. 15C is a cross sectional view of a hexagonally deformed tube embodiment showing weld and hold surfaces.

The deformed shape (i.e. non-circular cross section) of optics tube 140 significantly reduces tolerance requirements because of the flexibility of the tube walls. The ball 14, 124 can have zero radial tolerance over a wide range of dimensional variation while remaining easy to manipulate. A given optics tube may be adjusted to have just the right level of ball interference with simple tools that locally deform the tube. There is less chance for radial misalignment during welding since the areas of the deformed portions of the optics tube inner surface are in intimate contact with the ball at all times. In this regard, a hexagonally deformed tube (six contact surfaces) will have less deformation during three point welding because while three points of contact with the surface of ball 14, 124 are melted during the weld, three additional points of contact remain to prevent any movement of ball 14, 124. This configuration is illustrated in FIG. 15C.

The flexibility of the deformed optics tube 140 when the ball 14, 124 is placed inside it the fiber holder to be manipulated into place for alignment and then released without any welding. No misalignment will occur during or after release. That is, the aligned fiber stays where it is put because of the inwardly directed spring force and the resulting frictional pressure. Numerous assemblies can be aligned in an alignment station and stored for subsequent welding in a different welding station. It is possible to achieve similar mechanical stability with optics tube 14, but the tolerances between the ball 14, 124 and the inner surface of the optics tube 14 must be extremely close. Similar effects may be achieved by pinching a slightly oversized cylindrical tube to form a plurality of contact points as illustrated in FIG. 15C.

Figure 16A:
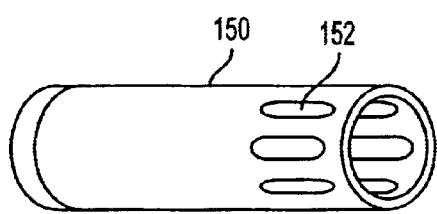
FIGS. 16A and 16B illustrate an embodiment of the optics tube having slots that provide an interference fit for the fiber holder.
Figure 16B:
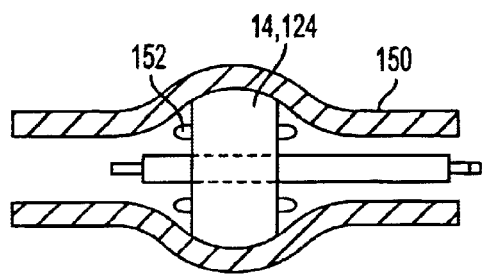
Figure 17A:
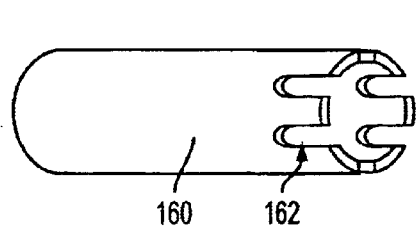
FIGS. 17A and 17B illustrate an alternative embodiment of the optics tube having slots that provide an interference fit for the fiber holder.
Figure 17B:
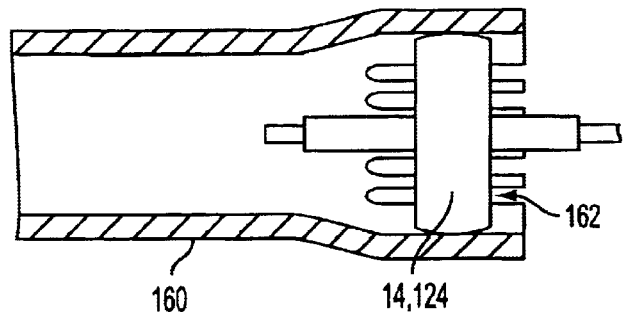

Alternative means for providing a spring compliant interface between the ball 14, 124 and the tube may also be provided. In one alternative embodiment illustrated in FIG. 16A, optics tube 150 is provided with one or more slots 152, that are advantageously located parallel to the tube axis. In a second embodiment illustrated in FIG. 17A, optics tube 160 includes one or more slots located at the end of the optics tube. Providing slots in the wall of the optics tube allows for greater freedom in the spring constant of pressure between the optics tube and ball 14, 124 (FIGS. 16B, 17B). Slots also provide a better view of the area where the ball 14, 124 is in contact with the tube, which is useful during the laser welding process.

Figure 18:
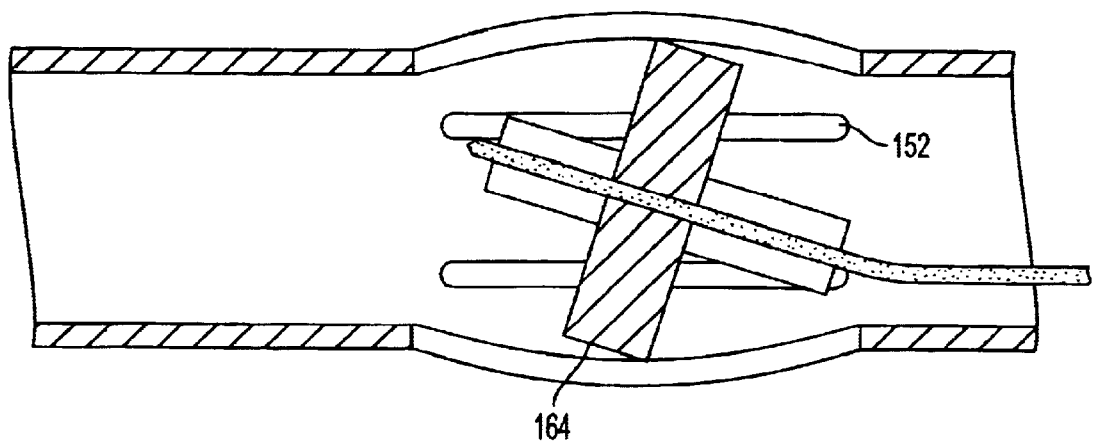
FIG. 18 is a cross sectional view of an embodiment of a square edged washer used to align optical fiber inside an optics tube.

The slots also provide a natural means of adding polymeric materials to the fixation interface. The greater flexibility of the slotted tube design allows a simple conventional square or flat edged circular washer 164 to serve as the structure for ball 14, 124 in embodiments where the amount of rotation about the optical axis 20 is small and that the washer is relatively thin (FIG. 18). The edge of such a washer may also be rounded to approximate a thin slice through a spherical ball.

For clarity, the slotted spring action of the tubular support against the alignment washer interior to it has been depicted in the drawing as if the tube expands outward. However, the slotted area of the optics tube can be compressed or bent slightly inward before inserting the internal alignment washer 164. This allows the spring action to result in expanding the slotted area to a diameter equal to the outer diameter of unslotted areas of the tube. Such an embodiment of the slotted tube has an added benefit that the internal washer does not have difficulty passing through the unslotted sections of the optics tube 150, 160.

Figure 19:
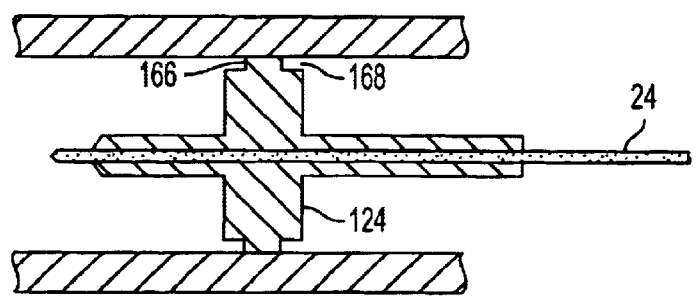
FIG. 19 is a cross sectional view of an alternative embodiment of the fiber holder having a step around the perimeter of the square edged washer.
Figure 20:
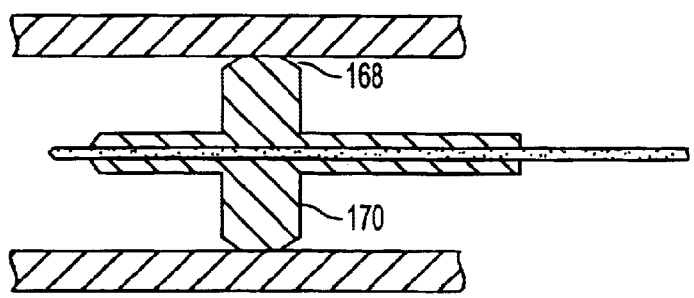
FIG. 20 is a cross sectional view of an alternative embodiment of the fiber holder having a chamfer around the perimeter of the square edged washer.

An alternate design to the ball for a bonded or soldered rod/ball alignment structure may alternatively be used. A ball is a natural shape for rotational movement inside of a tube. When rotation is limited in angle a truncated ball or spherical edged washer serves as well. When the walls of the tube are made compliant by deformation from circular cross section, slitting the tube along its axis brings the area at the circumference of a square edged washer 164 into continuous contact with the optics tube. While the ball 14, 124 may have a capillary gap between the tube wall and its surface, this is not always true of the square edged washer. The capillary gap can be filled with solder or a low viscosity liquid polymer when such materials are used to bond the two parts together. Directing attention to FIG. 19, the square edged washer 124 can be modified by adding a step 166 around its perimeter, resulting in a controllable capillary gap 168 at the interface between the tube interior and the washer perimeter. FIG. 20 illustrates an embodiment where square edged washer 124 has a chamfer 170 about its circumference to provide capillary gap 168.

Embodiments described above have focused on modifications to the optics support tube to make it size tolerant for a slip fit or spring fit to an internal mating circular washer. FIGS. 21A and 21B illustrate an embodiment wherein a flexible, split fingered fiber holder 172 is used to position optical fiber 24 and ferrule 178 within an unmodified cylindrical optics tube 174. A spring fit can result from deflection of the fiber holder 172 itself or from deformation of the optics tube 174.

The fiber holder 172 can slide axially and the ferrule 178 can be moved perpendicular to the tube axis to adjust the position of the fiber tip. When the position is as desired the fiber holder 172 is fixed by penetration weld of the optics tube, solder, or inorganic or organic adhesive application. The intimate contact between the optics tube 174 and the fingers of the fiber holder 172 causes little or no relative movement due to weld shrinkage, glue shrinkage, or solder shrinkage. Symmetrical placements of welds, solder or glue about the tube axis aids in minimizing solidification shrinkage movement.

Directing attention to FIGS. 22A and 22B, an alternative embodiment provides a non-circular washer 180 as a fiber holder for use with optics tube 174. The lobes 182 of the non-circular cross section washer 180 contact the walls of the circular cross section optics tube 174. The optics tube 174 can spring outward at the lobe pressure points resulting in a non-binding interference fit assembly. The ferrule 178 slides axially and can be moved perpendicular to the tube axis to adjust the position of the fiber tip. The ferrule 178 can be fixed in position by methods as described above.

Figure 23A:
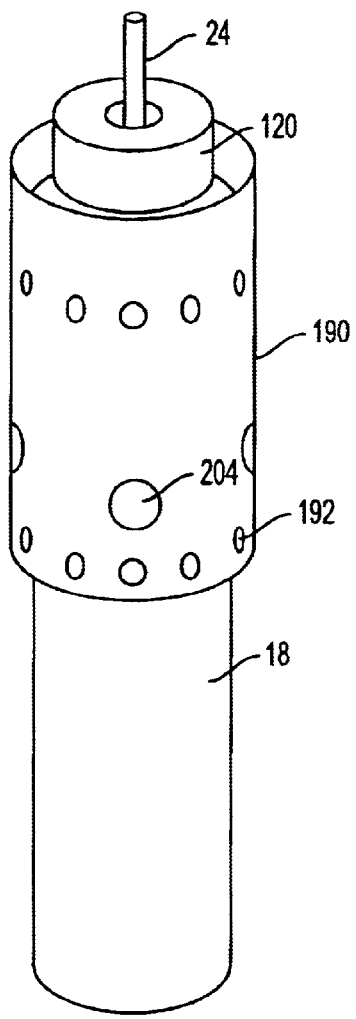
FIGS. 23A and 23B provide prospective and cross sectional views of an embodiment having an optics tube bonded to a heat sink and rod/ball fiber holder.
Figure 23B:
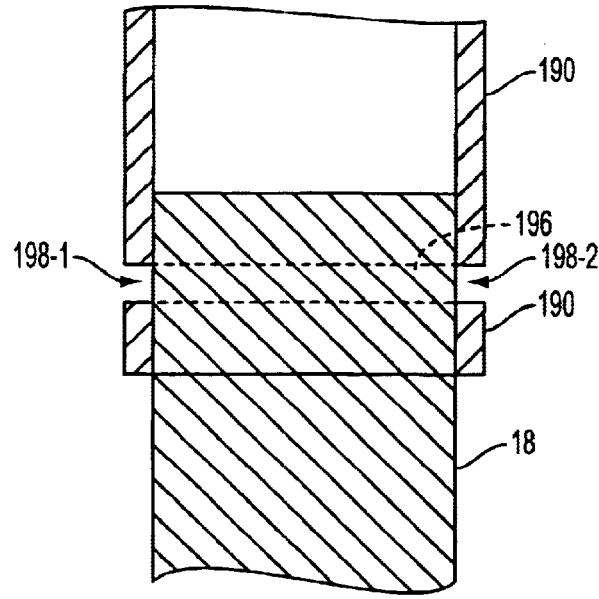

The previous descriptions of the singlemode fiber coupling structure of the present invention have by and large described elements and structures that are attached by laser welding. Laser welding equipment is both costly as well as complicated. Laser welding results in an extremely strong structure, but even balanced welding can result in distortion from imbalanced welding stresses. Imbalanced stresses can cause distortions that can lead to optical misalignment and loss of coupling efficiency. Directing attention to FIG. 23A, an embodiment of the present invention reduces the stresses at the critical points of structural attachment by utilizing polymeric adhesives to bond the various elements together. The adhesives can be rapid setting or cured with the aid of optical, ultraviolet radiation or thermal radiation. Preferably, inorganic materials, such as silicate, colloidal silica, colloidal alumina, or other ceramic, hydraulic or geopolymeric adhesives are used in assembly of the alignment structure. These inorganic adhesives can provide a path to the use of adhesive bonding in packages that contain high power laser diodes without introducing organic contamination and subsequent reliability problems. Some of the colloidal silica based adhesives provide the added benefit that after package vacuum bake they actively getter residual water vapor, much like their silica gel relatives. The use of polymeric materials, even those possessing different coefficients of thermal expansion does not lead to misalignment over temperature because the excursions are radial and symmetric about the optical axis. Optics tube 190 is provided without the base cuts 50 of optics tube 12 in order to provide increased strength and reduced stresses at the joint between the heat sink 18 and the optics tube 190. The base cuts 50 are replaced by suitably sized and located bonding bores 192 in the optics tube wall. The optics tube 190 can be sized to be press fit on the surface of the heat sink 18. If necessary, polymeric material may be introduced into bores 194 (FIG. 24) in the surface of the heat sink 18 that align with bores 192 in the optics tube 190 where the heat sink 18 and optics tube 190 are pressed together. Alternatively, the optics tube 190 can be configured with annular or capillary groove 196 (FIG. 23B) having a depth of approximately 0.25 mm around its perimeter under the area where the heat sink 18 and the optics tube 190 are brought into contact with each other. Injection bores 198 in the optics tube 190 provide access the groove 154 can be used to inject adhesive into the groove. Adhesive injected or wicked into bore 198-1 fills the annular groove 196 and appear at bore 198-2 on the opposite side of optics tube 190, thus ensuring a complete verifiable bond line. Similarly, the rod/ball fiber holder 120 can include shallow bores 200 (FIG. 25) that align with bores 202 on the optics tube 190 that allows for adhesive placement or injection.

Figure 24:
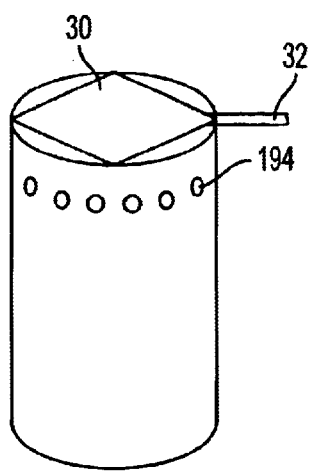
FIG. 24 is a perspective view of an embodiment of the heat sink incorporating a series of bonding bores.
Figure 25:
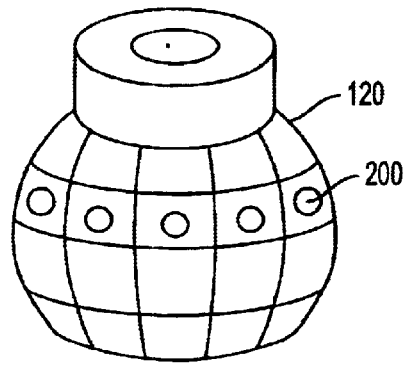
FIG. 25 is a perspective view of an embodiment of the rod/ball fiber holder incorporating a series of bonding bores.

An embodiment of an assembly and alignment process for the weld free embodiment is now described. The substrate 30 and flexible beam lead (electrical lead 32) is brazed to the heat sink 18 and aligned to the surface of the heat sink 18 (FIG. 24). The laser diode 16 is die attached to the substrate 30 and aligned to the surface of the heat sink 18 using standard assembly techniques known to those skilled in the art. The laser diode 16 is wire bonded to make one electrical connection to the electrical lead 32 and the second electrical connection to the heat sink 18 (or second electrical lead if so desired). The electrical lead 32 is bent upward and threaded through the access slots 160 located in the lower section of the optics tube 190. Access slots 160 are suitably sized and located to receive the electrical lead 32. Optionally, lens 36 and lens holder 38, 58 are pre-assembled into optics tube 190 by mechanical pressing, soldering, brazing, or adhesive bonding operations. The optics tube 190 and heat sink 18 are positioned and press fit together so that any adhesive bonding features are suitably aligned. The bonding bores 192 are then injected with adhesive. The adhesive formulation may be filled or thinned for greater strength, lower shrinkage, higher or lower viscosity, or a closely matched coefficient of thermal expansion. The rod/ball fiber holder 120 with optical fiber 24 attached is moved axially and rotated so that the optical fiber 24 is axially and radially aligned to the best position for coupling the laser beam. An adhesive with suitable filler and viscosity is injected into bonding bores 166 in the rod/ball fiber holder 120 and the access slots 204 in optics tube 190. The adhesive is allowed to cure to pin the rod/ball fiber holder 120 to the optics tube 190 in its aligned position. The assembly is complete and ready for insertion into higher levels of assembly in the manner discussed earlier.

An embodiment of a simplified design for coupling shaped fiber to a laser diode is also provided by the invention. If the tip of the optical fiber is suitably shaped and allowed to extend past the face of the ball 14, 124 (referred to herein as fiber set back or "stick out"), high efficiency coupling to the laser diode 16 can occur without any lens elements. The alignment action is the same with the fiber holder 14, 120 sliding axially in the optics tube 12, 140, 190 for axial alignment and the ball rotating perpendicular to the optical axis 20 for X and Y alignment. If the fiber tip is chisel shaped, or other shape without cylindrical symmetry about the optical axis, then rotational alignment about the optical axis 20 is easily achieved by rotation of the fiber holder 14, 120 about the optical axis 20.

Figure 26:
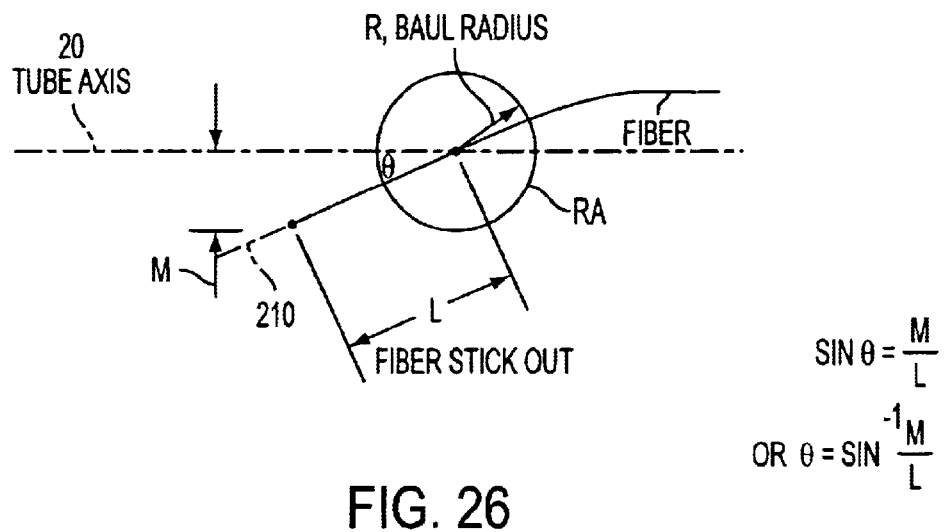
FIG. 26 illustrates the angle of misalignment between the optical axis and fiber axis.
Figure 27:
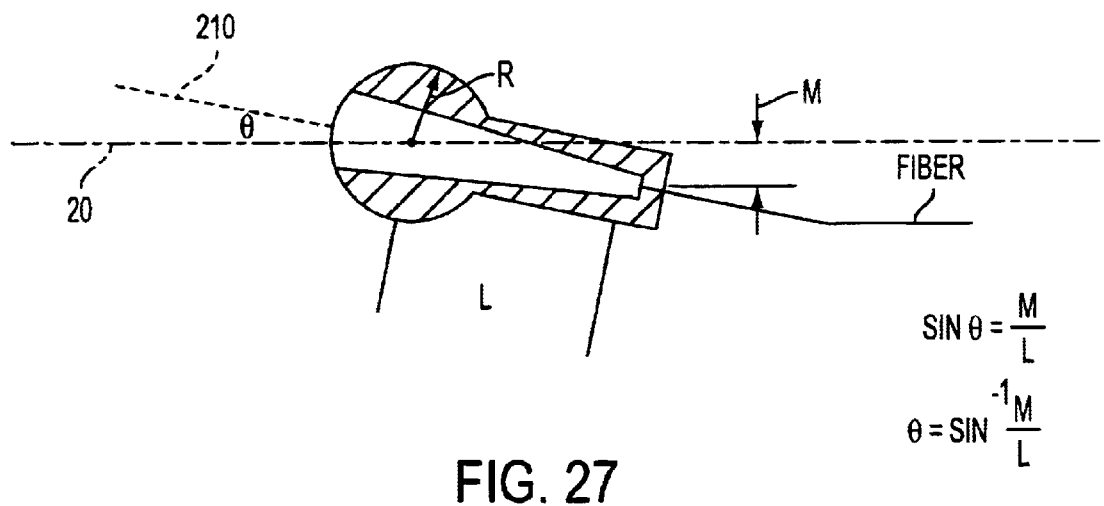
FIG. 27 illustrates the angle of misalignment when fiber stick out is placed on the opposite side of the ball.

Directing attention to FIG. 26, the angle of misalignment ($\theta = \sin^{-1} M/L$ where M is the radial movement of the fiber tip and L is the length of the fiber set back or stick out) between the axis of the core of the optical fiber (fiber axis 210) and the optical axis 20 of the optics tube can be made as small as desired by allowing the fiber core to be moved farther from the center of the ball. The distance that can be increased to reduce the angle required to achieve a given amount of fiber tip movement is the distance from the tip of the fiber and the center of the ball. The longer the lever arm the smaller the angle required to move the tip a given distance. The distance can be on either side of the ball center in relation to the focal spot. A similar relationship exists where the fiber tip is located on the other side of the ball center (FIG. 27). This may be beneficial as in the case of a decision where the optics tube length must be short.

In either construction the formulas show that for a given required radial movement of the fiber tip the angular misalignment of the fiber axis 210 from the optical axis 20 can be made as small as desired by increasing the fiber stick out or set back length L. In practice the required value (M) of the radial movement of the fiber tip will be much smaller than the ball radius so that terminating the fiber at or within the ball diameter will provide an acceptable angular misalignment.

Figure 28:
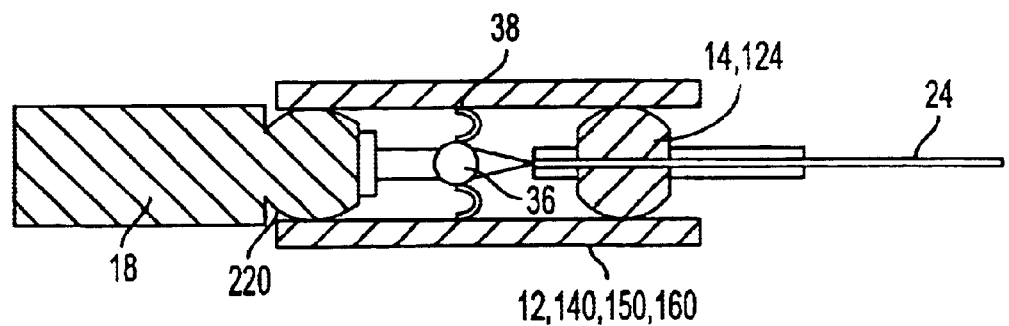
FIGS. 28 and 29 are cross sectional views of an embodiment wherein the heat sink has a spherical portion.
Figure 29:
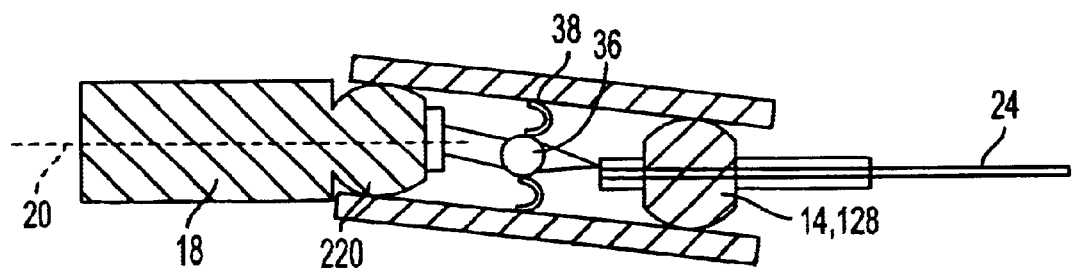

Directing attention to FIGS. 28 and 29, an embodiment provides fiber alignment without angular error. With a single ball swivel, adjustments perpendicular to the optical axis 20 cause an angular error between the fiber axis and the optical axis. In an embodiment shown in FIG. 28, the end of the heat sink 18 incorporates a segment of spherical shape 220 in the area where the optics tube (12, 140, 150, 166) presses over the heat sink 18, allowing adjustments perpendicular to the optical axis 20 to be made without the angular error occurring as illustrated in FIG. 29.

Figure 30A:
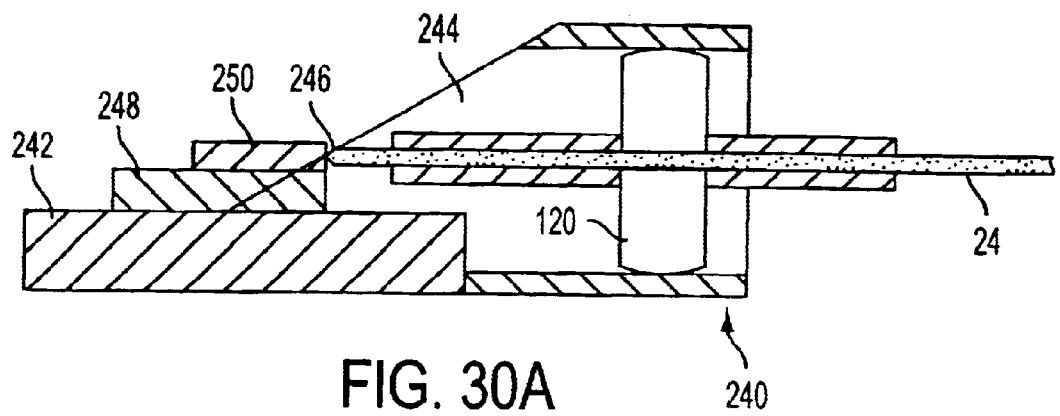
FIGS. 30A and 30B are perspective and cross sectional views respectively of an embodiment accommodating edge emission lasers.
Figure 30B:
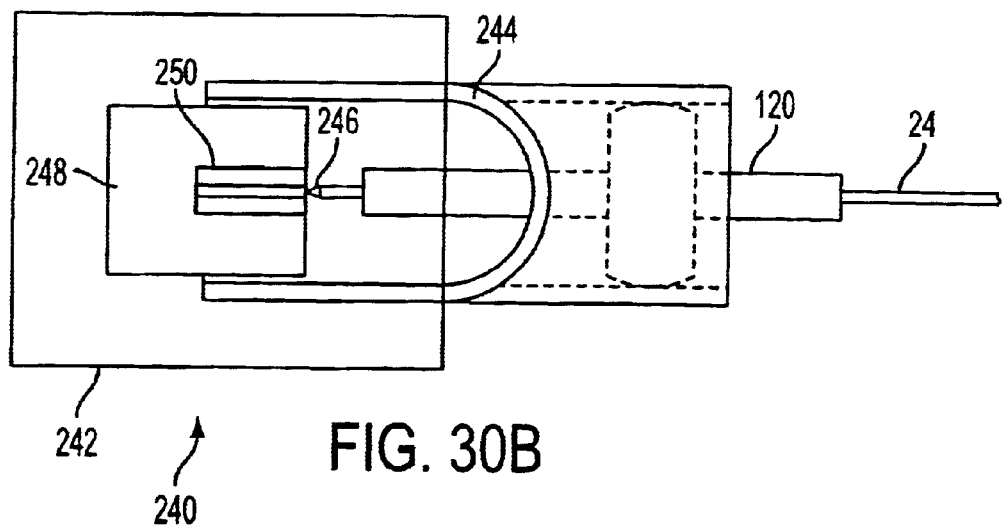

In another aspect, the invention provides a planarized heat sink swivel aligned fiber coupling design that is particularly well suited to edge emitting lasers and chisel lensed fibers. For edge emission lasers that are provided prescreened on a ceramic sub-mount it is appropriate to mount and wire interconnect them to a planar substrate mount. Edge emitting lasers also often have an emission pattern more suitable for coupling to a fiber by means of a chisel shaped fiber without any other optical elements. The embodiment illustrated in FIGS. 30A and 30B is applicable to such applications. Structure 240 includes of a planar heat sink 242 onto which is attached optics tube 244. The optics tube 244 encloses a rod/ball fiber holder 120. Optical fiber 24 is affixed to fiber holder 120 in the manner described above. The fiber tip 246 protrudes past fiber holder 120, and is shaped to effectively couple to the emission of a laser diode 250. Heat sink 242 can be constructed of metalized patterned ceramic for routing laser diode and auxiliary electrical elements such as a photodiode, heat sink of BeO or AlN or other suitable ceramics or other materials having good thermal conductivity. Optics tube 244 can be made from kovar or invar or other suitably expansion matched materials (i.e. matched to the ceramic heat sink). Fiber holder 120 can be made of ceramic ferrule such as ST, LC, MV or other standards, and is pressed into a spherical edged washer (or soldered or bonded, organic or inorganic) made of kovar or invar or other suitably expansion matched material. Alternatively, fiber holder 120 can be made of an $Al_2O_3$ ferrule that is pressed into a nickel plated kovar washer that has a spherical edge radius equal to or substantially qual to the inner diameter of the optics tube 244. The fit between the inside of the optics tube 244 and the fiber holder 120 is sized such that the fiber holder 120 slides inside the optics tube but remains in place when released. Optics tube 244 can be made from gold plated over nickel kovar and is attached to the BeO substrate patterned and metalized on its upper surface with Au/Ge eutectic or other suitable high temperature solder. Alternatively, the optics tube 244 can be locally deformed as described above in previous embodiments. A laser diode submount assembly 248 is attached to the BeO substrate aligned in alignment in relation to the optics tube 244 using Au/SN eutectic or other suitable flux free or fluxed solder.

The fiber holder 120 assembly has a chisel end shaped fiber inserted through the hole in the ceramic ferrule so that the tip 246 extends a short distance past the end of the ferrule using a colloidal silica glass filled adhesive that is suitably cured. The fiber holder 120 assembly with fiber is aligned with the laser diode 250 by sliding it axially rotating it to align the chisel to the emission pattern, moving the outer rod section perpendicular to the optical axis 20 to bring the fiber tip 246 into optical coupling maximum, the optics tube 244 at the location of contact with the fiber holder 120 spherical radius is penetrated by three radially symmetric welds locking the fiber holder 120 into position. Alternatively, the fiber holder 120 could be fixed in place by allowing a low viscosity inorganic adhesive to wick into the capillary gap that exists between the non-contacting fiber holder 120 spherical radius perimeter and the inside of the optics tube 244.

Bores located on the perimeter of the optics tube 244 can be provided to ease the introduction of the adhesive material. The adhesive would be allowed to cure. The entire coupled assembly can be attached to a package base or thermoelectric cooler with a low temperature solder between the metalized bottom of the ceramic heat sink 242 and the package base or TEC.

The invention also provides a structure and method for a planar design for a polymerically bonded fiber coupled laser diode assembly. Polymeric materials, either or both organic and inorganic, are useful assembly tools for parts that require precise alignment. They have drawbacks, however, in that they may tend to shrink during polymerization or evaporation, and in general may have different coefficients of expansion to the materials that they join together. Low viscosity liquids have the strong ability to be drawn into a thin gap or pore, by what is called capillary action, or wicking. If two parts with rough surface finishes, occurring naturally or deliberately created, are placed in intimate contact, a series of pores or channels exist in the interface. A layer of thin liquid or dispersion or colloid if applied to one area of the interface will be drawn into the pores and channels of the interface. If the liquid polymerizes and bonds to the surfaces of the interface the two parts will be joined. Even if significant shrinkage occurs during the polymerization process, there will be no dimensional change in the relation between the two parts because the parts started intimately in contact with each other. Especially if shrinkage occurs, any expansion during the temperature excursions will cause little or no movement between the bonded parts because of the small thickness of the bond line as well as the fact that the expansion can occur into the void areas of the capillaries and channels not fully filled with polymer. This description applies as well to line contacts between rough surface parts.

Figure 31A:
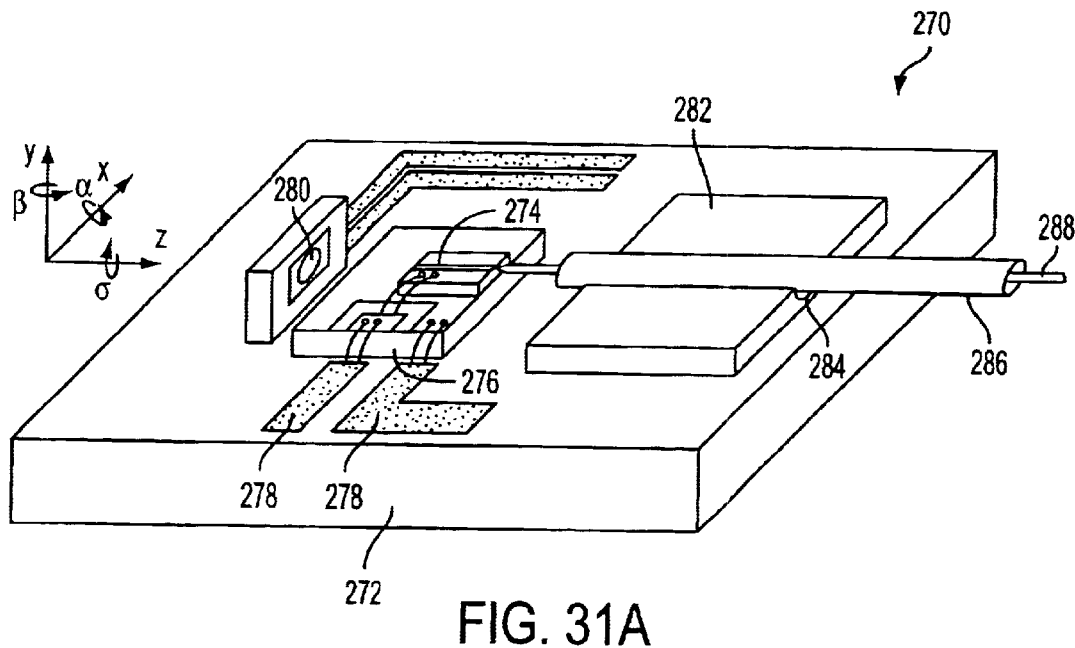
FIGS. 31A and 31B are perspective and cross sectional views respectively of an embodiment having a rigid planar substrate and raised pedestal supporting a laser diode.
Figure 31B:
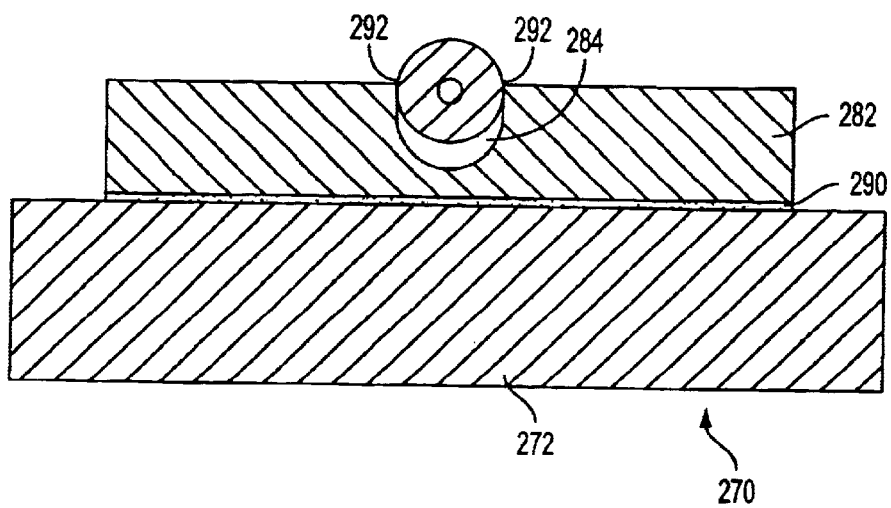

FIGS. 31A and 31B show an embodiment of the present invention incorporating the same concepts described above. Structure 270 utilizes a rigid planar substrate 272 with a laser diode 274 mounted on a raised pedestal 276. The substrate 272 has a conductive pattern 278 to facilitate electrical connections as necessary. Auxiliary components and structures such as photodiode 280, thermistors, and similar components can be included in the structure 270. A sliding alignment plate 282 with a grooved channel 284 is placed on the planar substrate 272 in front of the laser diode 274. The channel 284 faces away from the planar substrate 272 and is roughly centered and aligned to the axis of the laser emission. An optics tube containing a suitably dimensioned and shaped optical fiber 288 to couple to the output light of the laser diode 274 with a diameter very closely matched to the width of the channel 284 is placed in the channel 284. The optics tube 286 tube is manipulated in one or more of the X, Y, Z, theta, alpha and beta as required to optimize the coupling of the laser light into the fiber. During the manipulation of the optics tube 286, it moves within the channel 284 and the alignment plate 282 slides and rotates in contact with the planar substrate 272. A small quantity of inorganic adhesive of appropriate composition and viscosity is wicked into the gap 290 between the alignment plate 282 and planar substrate 272. A similar material is wicked along the capillary gaps 292 on each side of the tube. Polymerization from solvent evaporation or reaction to the surface materials locks the two parts together. A subsequent elevated temperature, either with or without vacuum, process fully cures the polymer and removes any residual solvent. The completed assembly can be bonded to other structures such as a package interior baseplate or a thermoelectric cooler inside of a package. The planar substrate 272 can be constructed from fired BeO (or AlN) metalized and patterned to expose ceramic rough surfaces at the location of the sliding alignment plate 282. The pedestal 276 can be constructed from BeO or AlN metalized on both sides and patterned to allow laser cathode and anode connection. The pedestal 276 can include a prescreened subassembly attached with a suitable solder alloy, such as gold/tin eutectic, to the planar structure. The optics tube 286 can be made from glass or ceramic with an expansion match close to the alignment plate value. The alignment plate 282 can be made from a ceramic with expansion match close to that of the planar substrate, such as BeO or AlN or $Al_2O_3$.

An adhesive inorganic polymer made of colloidal silica, colloidal alumina, or combinations of the above with sodium silicate (or potassium silicate) can be used for the low viscosity component. Fillers of appropriate glass or ceramic powders can be used as reservoirs of low shrinkage nature at the locations where the polymeric material was wicked into the pores and channels and at the line contacts at the optics tube 286. After complete polymeric curing, the assembly can be bonded to a package base or TEC with a low temperature solder such as indium/tin eutectic, indium silver eutectic or bismuth/tin alloys.

As may be appreciated from the foregoing description, the invention provides numerous alignment and attachment structures and methods. A further such structure and method are provided by a self-aligning low energy input method of locking two parts together in ball and tube structures. The ball in tube, ball in deformed tube, and washer in tube structures described herein are usually permanently fixed in relation to each other once they have been adjusted to proper alignment. Laser or other welding, bonding with organic and inorganic adhesives, soldering and brazing have been discussed as methods of attaching the parts. These methods typically involve the placement of the material in the joint between the two parts in an axially symmetric manner so that shrinkage during solidification of the joining material will not cause rotation of the part within the bore. If it were possible to have the areas of contact between the two parts to be joined define the location of the joining material, then automatic symmetry of material would be assured. Such a situation is possible if the material or coatings on the two parts to be joined form an alloy, or if a coating on one or both parts melts, at a temperature below the melting point of the parts themselves. What occurs is a joining only at the points of contact even if heat to create the melted area is not symmetrically supplied. An additional benefit of this concept is that much less energy input into the structure is required to create the joint. Reduced energy implies reduced distortion, movement, and residual stress.

In embodiments having a spherically shaped fiber holder portion placed in an optics tube with a very slight interference fit is to be fixed within the tube by laser welding, if the laser welds are used, assume three radially symmetric welds around the tube axis (120 degrees apart) have a small error in their axial placement, then some ball rotation can occur during weld shrinkage.

By providing a thin plating of gold on the inner surface of the optics tube and a thin plating of tin on the ball portion of the fiber holder, if the laser energy is reduced to a point that it heats the tube wall to 300 degrees C in an area that includes the contact between the tube and ball, then the only place of joining between the tube and ball occurs at the contact point where a gold/tin alloy forms and solidifies. The joining location is at the exact contact point even if the heat is not centered on the contact location. Because the laser must heat the optics tube only to 300 degrees C rather than to the melting point of the tube, much less energy in the form of heat is transferred to the tube and fiber holder. Less distortion occurs during the weld. For laser welding there is the significant additional benefit that the shock to the structure that occurs from ablated metal at the tube surface is reduced or eliminated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus to align a tip of an optical fiber with a light source using translational movement along three perpendicular axes including a X axis, a Y axis, and a central axis, and a rotational movement around the central axis, the apparatus comprising:

a fiber holder to receive a portion of the optical fiber;

a substantially tubular interface having the longitudinal central axis, a first open end to receive at least a portion of the fiber holder along the central axis and a second end that is positionable to receive light emitted by the light source; and wherein the fiber holder is adjustable within the substantially tubular interface along the X axis, the Y axis, and the central axis, and is adjustable about the central axis.

2. The apparatus of claim 1, wherein the second end is positioned to receive light emitted by the light source placed within the second end between a heat sink and the fiber holder.

3. The apparatus of claim 2, wherein the light source comprises a laser diode.

4. The apparatus of claim 3, wherein the laser diode includes at least one connection by which the laser diode receives power, the interface including an aperture through which the at least one connection connects the laser diode to a power source.

5. The apparatus of claim 1, further comprising a lens aligned substantially perpendicular to the central axis, wherein the second end is positionable to receive light emitted by the light source through the lens.

6. The apparatus of claim 5, further comprising a lens holder, the lens holder including an inner surface to secure the lens and an outer surface to secure the lens holder with respect to the interface.

7. The apparatus of claim 1, wherein the fiber holder includes a substantially spherical portion having a center and a channel of sufficient dimension to receive the portion of the optical fiber, the channel located through the center of the substantially spherical portion of the fiber holder.

8. The apparatus of claim 7, wherein the fiber holder further comprises an annular groove around the circumference of the spherical portion, the annular groove capable of receiving bonding material to secure the portion of the fiber holder received within the interface.

9. The apparatus of claim 7, wherein the fiber holder comprises at least one capillary gap, the capillary gap capable of receiving bonding material to secure the portion of the fiber holder received within the interface.

10. The apparatus of claim 1, wherein the fiber holder comprises a substantially spherical member and a substantially cylindrical member, the spherical member and cylindrical member having respective central axes, and a channel of sufficient diameter to receive the optical fiber is located along the respective central axes.

11. The apparatus of claim 1, wherein the fiber holder comprises a substantially spherical portion having a center and a channel of sufficient dimension to receive the optical fiber, the channel located through the center of the substantially spherical portion.

12. The apparatus of claim 1, wherein the fiber holder is secured to the interface by a radial press interference fit.

13. The apparatus of claim 12, wherein the interface is distended by the insertion of the fiber holder to provide a radial press interference fit.

14. The apparatus of claim 1, wherein the fiber holder is secured to the interface by polymeric bonding.

15. The apparatus of claim 1, wherein the fiber holder is welded in place inside the interface.

16. The apparatus of claim 1, wherein the fiber holder has a non-circular profile to provide discrete contact points between the fiber holder and the interface.

17. The apparatus of claim 1, further comprising:
a heat sink;
the second end further comprises a second open end to receive at least a portion of a heat sink through the second open end, wherein the heat sink is securable to the interface by polymeric bonding.

18. The apparatus of claim 17 wherein the heat sink has a cylindrical shape and comprises a plurality of bores that contain polymeric bonding material that secures the heat sink to at least a region of the second end when at least a portion of the heat sink is received by the interface through the second open end.

19. The apparatus of claim 17, wherein the heat sink further comprises at least one capillary gap, the capillary gap holding bonding material that secures the heat sink to the interface when a portion of the heat sink is brought into contact with the interface.

20. The apparatus of claim 1, further comprising:
a heat sink;
the second end further comprises a second open end to receive at least a portion of the heat sink through the second open end, wherein the at least a portion of the heat sink is welded in place inside the interface.

21. The apparatus of claim 1, further comprising:
a heat sink;
the second end further comprises a second open end to receive at least a portion of the heat sink through the second open end, wherein the at least a portion of the heat sink is press fit inside the interface.

22. The apparatus of claim 1, further comprising:
a heat sink;
the second end further comprises a second open end to receive at least a portion of the heat sink through the second open end, wherein the fiber holder, heat sink, and interface are secured to a clamping block.

23. The apparatus of claim 22, wherein the clamping block encloses the fiber holder, heat sink, and interface.

24. The apparatus of claim 22, wherein the fiber holder, heat sink, and interface are strapped on top of the clamping block.

25. The apparatus of claim 1, wherein the interface includes at least one access slot allowing access to at least a portion of the fiber holder received by the interface such that the fiber holder can be aligned through the at least one access slot.

26. An interface structure for aligning and holding in alignment a laser diode and an optical fiber tip, the interface structure having a central axis of rotation and allowing translational movement along at least three axes including a X and Y axes and the central axis, the interface structure including a first open end dimensioned to receive at least a portion of a fiber tip holder and dimensioned to achieve a radially extending interference press fit that retains the fiber tip holder, and a second open end dimensioned to receive at least a portion of a heat sink coupled with the laser diode such that the translational movement of the fiber holder along the at least three axes is such that the optical fiber tip is positionable to receive light emitted by the laser diode.

27. The interface structure of claim 26, wherein the interface has a substantially cylindrical structure and said cylindrical shape of the structure comprises a center portion, wherein the center portion distends to receive the fiber holder in a press fit.

28. The interface structure of claim 27, wherein the center portion is slightly deformed to have a noncircular cross section.

29. The interface structure of claim 26, further comprising a plurality of access slots located proximate to the first end and extending parallel to the central axis.

30. The interface structure of claim 26, further comprising an access slot located proximate to the second end to provide access for an electrode to be attached to the laser diode.

31. A method for aligning a light source with an optical fiber having a tip using translational movement along three perpendicular axes including a X and Y axes and a central axis, and a rotational movement about the central axis such that when light is emitted from the light source the light is transmitted to the tip of the optical fiber, the method comprising:
placing at least a region of the optical fiber adjacent the tip in an optical fiber holder, the fiber holder of suitable dimension to fit within a substantially tubular member having a central axis;
inserting the optical fiber holder and at least the tip of the optical fiber within the tubular member;
inserting the light source within the tubular member such that the light source is located proximate the tip of the optical fiber;
manipulating the tip in any combination of at least a first axis of the three perpendicular axes to position the tip to be in substantial alignment with the central axis; and
manipulating the tip in any combination of at least a second axis of the three perpendicular axes to position the light source to be in substantial alignment with the central axis, such that the tip is positioned to receive light emitted by the light source.

32. The method of claim 31, further comprising attaching a heat sink to the light source.

33. The method of claim 32, wherein inserting the light source within the tubular member comprises press fitting the heat sink carrying the light source to the tubular member.

34. The method of claim 31, wherein inserting the fiber holder within the tubular member comprises press fitting the fiber holder into the tubular member to create a radial interference fit.

35. The method of claim 31, wherein inserting the fiber holder within the tubular member further comprises welding the fiber holder to the tubular member.

36. The method of claim 31, wherein inserting the fiber holder within the tubular member further comprises bonding the fiber holder to the tubular member.

37. The method of claim 31, wherein inserting the heat sink within the tubular member further comprises welding the heat sink to the tubular member.

38. The method of claim 31, wherein inserting the heat sink within the tubular member further comprises bonding the heat sink to the tubular member.

39. The method of claim 32, further comprising placing the tubular member, light source, optical fiber, and heat sink in a clamping block.

40. An apparatus for actively aligning an optical fiber tip to receive light emitted by a light source relative to any one or combination of three perpendicular axes including a X and Y axes, and a central axis, comprising:
- a fiber holder having a substantially spherical portion having a center and a channel of sufficient dimension to receive a tip at an end of the optical fiber, the channel located through the center of the substantially spherical portion of the fiber holder;
- a heat sink;
- a substantially tubular interface having a central axis along its center, a first open end and a second open end, the interface receiving the fiber holder through the first open end along the central axis and creating a radially directed interference press fit with the fiber holder such that the fiber holder can be adjusted relative to the X and Y axes, and the interface receiving the heat sink through the second open end, the fiber holder receiving and holding an optical fiber and aligning the tip with the central axis; and
- a laser diode aligned with the central axis and placed within the interface between the heat sink and the fiber holder, the laser diode attached to the heat sink such that heat generated from operation of the laser diode is drawn by the heat sink.

41. The apparatus of claim 1, wherein the interface allows alignment to an arbitrary level of alignment accuracy between the tip and the light source.

42. The apparatus of claim 1, wherein the substantially tubular interface allows a x-axis, y-axis, and z-axis translation, and α-angular, β-angular, and θ-angular rotational alignment to an arbitrary level of alignment accuracy between the tip of the optical fiber and the light source.

43. The apparatus of claim 1, wherein the alignment includes x-axis, y-axis, and z-axis translation, and θ-angular rotation.

44. The apparatus of claim 1, wherein the alignment comprises an active alignment for achieving a position tolerance smaller than a machined tolerance of the fiber holder and the interface.

45. The apparatus of claim 1, further comprising a heat sink and wherein the interface further having a second open end and receiving the heat sink through the second open end.

46. The apparatus of claim 1, wherein the fiber holder is secured to and aligned with the interface along an x-axis and a y-axis by a radial press interference fit.

47. The apparatus of claim 14, wherein the polymeric bonding comprises wicking an inorganic polymeric bonding material between said fiber holder and said interface and hardening said polymeric bonding material to lock said aligned structure.

48. The apparatus of claim 14, wherein the polymeric bonding comprises an organic polymer.

49. The apparatus of claim 14, wherein the polymeric bonding comprises an inorganic polymer.

50. An interface structure as in claim 26, wherein the interface has a substantially cylindrical shape.

51. An interface structure as in claim 26, wherein the interface has a substantially non-cylindrical shape.

52. The interface structure of claim 26, wherein the interface structure allows alignment to an arbitrary level of accuracy.

53. The interface structure of claim 26, wherein the interface structure allows a x-axis, y-axis, and z-axis translation, and α-angular, β-angular, and θ-angular rotational alignment between the laser diode and the optical fiber tip to an arbitrary level of accuracy.

54. The interface structure of claim 26, wherein the alignment includes x-axis, y-axis, and z-axis translation, and θ-angular rotation.

55. The interface structure of claim 26, wherein the alignment comprises an active alignment for achieving a position tolerance smaller than a machined tolerance of the fiber holder and the interface.

56. The interface structure of claim 29, wherein at least some of said plurality of access slots provide aperture for applying adhesive to secure an aligned assembly.

57. The interface structure of claim 26, further comprising an access slot located proximate to the second end to provide access for a radially extending electrode to be attached to the laser diode and provide a low-height assembly.

58. An apparatus for actively aligning an optical fiber tip with a laser diode relative to any one or combination of movement along three perpendicular axes and a rotational movement, comprising:
- a fiber holder having a substantially spherical portion having a center and a channel of sufficient dimension to receive the tip at an end of the optical fiber, the channel located through the center of the substantially spherical portion of the fiber holder;
- a heat sink;
- a substantially tubular interface having a central axis along its center, a first open end and a second open end, the interface receiving the fiber holder through the first open end and creating a radially directed interference press fit with the fiber holder and receiving the heat sink through the second open end, the fiber holder receiving and holding at least a portion of an optical fiber and aligning the optical fiber with the central axis; and
- a laser diode aligned with the central axis and placed within the interface between the heat sink and the fiber holder, the laser diode attached to the heat sink such that heat generated from operation of the laser diode is drawn by the heat sink.

59. An apparatus to align an optical fiber with a light source, comprising:
- a fiber holder to retain a portion of the optical fiber;
- a substantially tubular member having a longitudinal axis, a first end of said tubular member defining an opening sized to receive a portion of said fiber holder, a second end of said tubular member positionable to receive light emitted by the light source; and
- wherein said fiber holder is adjustable within said tubular member along three perpendicular axes and is movable along said longitudinal axis such that a distal end of said optical fiber retained by the tubular member is positionable along a plane defined by and within said second end of said tubular member.

60. The apparatus of claim 59, wherein a movement along said plane represents movement along a x-axis and a y-axis.

61. The apparatus of claim 60, wherein said fiber holder is rotatable about said longitudinal axis.

62. The apparatus of claim 61, wherein the optical fiber includes a nonsymmetrical distal end and rotation of said fiber holder about said longitudinal axis aligns the nonsymmetrical distal end with respect to the light source.

63. The apparatus of claim 62, wherein the optical fiber includes a noncircular distal end and rotation of said fiber holder about said longitudinal axis aligns the noncircular distal end with respect to the light source.

* * * * *